(12) United States Patent
Saastamo

(10) Patent No.: US 10,138,063 B2
(45) Date of Patent: Nov. 27, 2018

(54) TAPERED ROLL FEED

(71) Applicant: USNR/KOCKUMS CANCAR COMPANY, Woodland, WA (US)

(72) Inventor: Petri Saastamo, Woodland, WA (US)

(73) Assignee: USNR/KOCKUMS CANCAR COMPANY, Woodland, WA (US)

( * ) Notice: Subject to any disclaimer, the term of this patent is extended or adjusted under 35 U.S.C. 154(b) by 0 days.

(21) Appl. No.: 14/230,785

(22) Filed: Mar. 31, 2014

(65) Prior Publication Data

US 2014/0209436 A1   Jul. 31, 2014

Related U.S. Application Data

(63) Continuation of application No. 12/786,240, filed on May 24, 2010, now Pat. No. 8,727,099.

(51) Int. Cl.
| | |
|---|---|
| *B65G 47/26* | (2006.01) |
| *B65G 13/04* | (2006.01) |
| *B65G 13/10* | (2006.01) |
| *B65G 47/53* | (2006.01) |
| *B65G 13/06* | (2006.01) |

(52) U.S. Cl.
CPC ............ *B65G 13/04* (2013.01); *B65G 13/06* (2013.01); *B65G 13/10* (2013.01); *B65G 47/53* (2013.01)

(58) Field of Classification Search
USPC .. 198/370.09, 371.3, 415, 456, 457.02, 608, 198/624; 226/34
See application file for complete search history.

(56) References Cited

U.S. PATENT DOCUMENTS

| | | | |
|---|---|---|---|
| 653,506 | A | 7/1900 | Edwards |
| 958,164 | A | 5/1910 | Parker |
| 1,140,782 | A | 5/1915 | Welton |
| 1,860,718 | A | 5/1932 | Mott |

(Continued)

FOREIGN PATENT DOCUMENTS

| | | |
|---|---|---|
| CA | 2741075 A1 | 11/2011 |
| CA | 2844227 A1 | 11/2011 |

(Continued)

OTHER PUBLICATIONS

Canadian Examiner's Report for CA 2741075 issued Jun. 28, 2013.

(Continued)

*Primary Examiner* — Gene O Crawford
*Assistant Examiner* — Lester Rushin, III
(74) *Attorney, Agent, or Firm* — Schwabe, Williamson & Wyatt, P.C.

(57) ABSTRACT

The present disclosure provides workpiece feed systems, methods and assemblies comprising one or more tapered feed rolls positioned at an angle to incoming workpieces. The tapered feed rolls may pull individual workpieces toward a guide while gradually accelerating the workpieces and altering their direction of travel. The angle and speed of rotation of the tapered feed rolls may be automatically adjusted to control workpiece speed/acceleration, providing improved gap control and minimizing collisions between successive workpieces. Tapered feed rolls may therefore reduce or eliminate the need for a conventional bridge to decelerate the workpieces after the directional change, reducing the operational space required by a workpiece feed system.

30 Claims, 11 Drawing Sheets

(56) References Cited

U.S. PATENT DOCUMENTS

| | | | |
|---|---|---|---|
| 1,878,315 A | 9/1932 | Phelps | |
| 1,960,307 A | 5/1934 | Fisk | |
| 3,189,162 A | 6/1965 | Brundell et al. | |
| 3,371,770 A | 3/1968 | Graham et al. | |
| 3,605,980 A | 9/1971 | Donohue et al. | |
| 3,610,404 A | 10/1971 | Fleischauer et al. | |
| 3,651,921 A | 3/1972 | Hill | |
| 3,750,799 A * | 8/1973 | Hill et al. | 198/457.07 |
| 3,929,327 A | 12/1975 | Olson | |
| 4,380,294 A | 4/1983 | Morris | |
| 4,384,642 A | 5/1983 | Gunderson | |
| 4,462,518 A | 7/1984 | Fait et al. | |
| 4,546,870 A | 10/1985 | Cogo | |
| 4,546,886 A | 10/1985 | Churchland et al. | |
| 4,699,262 A | 10/1987 | Nakano et al. | |
| 4,711,341 A * | 12/1987 | Yu et al. | 198/370.02 |
| 4,775,142 A | 10/1988 | Silverberg | |
| 4,823,851 A | 4/1989 | Steffens | |
| 5,012,915 A * | 5/1991 | Kristola et al. | 198/411 |
| 5,109,975 A | 5/1992 | Prettie | |
| 5,226,643 A | 7/1993 | Kriegel et al. | |
| 5,285,553 A | 2/1994 | Bahmer et al. | |
| 5,324,022 A | 6/1994 | Quackenbush et al. | |
| 5,465,953 A | 11/1995 | Takemoto et al. | |
| 5,494,276 A | 2/1996 | Faber et al. | |
| 5,531,311 A | 7/1996 | LeMay et al. | |
| 5,683,078 A | 11/1997 | Schieck | |
| 5,722,531 A | 3/1998 | Zimny et al. | |
| 5,735,378 A | 4/1998 | Sundquist | |
| 5,943,722 A | 8/1999 | Hamilton et al. | |
| 6,253,905 B1 | 7/2001 | Pelka | |
| 6,406,014 B1 | 6/2002 | Reist | |
| 6,499,586 B2 | 12/2002 | Furusawa et al. | |
| 6,622,847 B2 | 9/2003 | Schuitema et al. | |
| 6,634,486 B2 | 10/2003 | Bennett | |
| 6,669,002 B2 | 12/2003 | Itoh | |
| 6,896,019 B2 | 5/2005 | Achard et al. | |
| 7,035,714 B2 | 4/2006 | Anderson et al. | |
| 7,090,064 B2 | 8/2006 | Lutz | |
| 7,204,290 B2 | 4/2007 | Watabe et al. | |
| 7,293,639 B2 | 11/2007 | Stingel, III et al. | |
| 7,299,909 B1 | 11/2007 | Houghton | |
| 7,540,375 B2 | 6/2009 | Freudelsperger | |
| 7,854,314 B2 | 12/2010 | Pelak et al. | |
| 7,861,845 B1 | 1/2011 | Lapointe | |
| 7,931,137 B2 | 4/2011 | Wargo | |
| 7,934,721 B2 | 5/2011 | DeMarco et al. | |
| 7,967,124 B2 | 6/2011 | Theriault | |
| 8,245,832 B2 | 8/2012 | Fickeisen et al. | |
| 8,794,423 B2 | 8/2014 | Saastamo et al. | |
| 9,016,460 B2 | 4/2015 | Saastamo | |
| 9,387,988 B2 | 7/2016 | Saastamo | |
| 9,725,248 B2 | 8/2017 | Saastamo | |
| 2001/0032773 A1 | 10/2001 | Pelka | |
| 2003/0209407 A1 | 11/2003 | Brouwer et al. | |
| 2006/0260911 A1 | 11/2006 | Eckert et al. | |
| 2008/0078653 A1 | 4/2008 | Goater | |
| 2010/0191368 A1 | 7/2010 | Celeste et al. | |
| 2011/0284341 A1 | 11/2011 | Saastamo | |
| 2014/0138290 A1 | 5/2014 | Saastamo et al. | |
| 2017/0334656 A1 | 11/2017 | Saastamo | |

FOREIGN PATENT DOCUMENTS

| | | |
|---|---|---|
| CA | 2834521 A1 | 1/2014 |
| DE | 489627 | 1/1930 |
| DE | 2407173 | 8/1975 |
| EP | 0124269 | 11/1984 |
| EP | 2239214 B1 | 2/2016 |
| FR | 963642 | 7/1950 |
| FR | 1028638 | 5/1953 |
| FR | 2696660 | 4/1994 |
| GB | 1124209 A | 8/1968 |
| GB | 1138386 | 1/1969 |
| JP | 54-162272 | 12/1979 |
| WO | WO02/32797 A1 | 4/2002 |
| WO | 2014/081989 A1 | 5/2014 |

OTHER PUBLICATIONS

Canadian Examiner's Report for CA 2741075 issued Nov. 21, 2013.
US Office Action for U.S. Pat. No. 8,727,099 mailed May 18, 2012.
US Final Office Action for U.S. Pat. No. 8,727,099 mailed Mar. 25, 2013.
US Office Action for U.S. Pat. No. 8,727,099 mailed Sep. 24, 2013.
PCT International Search Report for PCT/US2013/071356 mailed Mar. 12, 2014.
US Office Action for U.S. Appl. No. 14/318,441 mailed Jul. 25, 2014.
Canadian Examiner's Report for CA 2741075 issued Aug. 7, 2014.
Canadian Examiner's Report for CA 2844227 issued Apr. 17, 2014.
Canadian Examiner's Report for CA 2834521 issued Mar. 14, 2014.
Canadian Examiner's Report for CA 2741075 issued Mar. 25, 2014.
US Notice of Allowance for U.S. Pat. No. 8,794,423 mailed Feb. 24, 2014.
US Notice of Allowance for U.S. Pat. No. 8,727,099 mailed Jan. 30, 2014.
U.S. Appl. No. 14/318,441, filed Jun. 27, 2014 (unpublished).
Canadian Examiner's Report for CA 2,875,172, mailed Feb. 18, 2015.
Specification for Canadian Divisional Application No. 2,869,064 filed Oct. 29, 2014.
Canadian Examiner's Report for CA 2,869,064, mailed Jan. 14, 2015.
Specification for Canadian Divisional Application No. 2,875,172, filed Dec. 16, 2014.
European Patent Application No. 13857458.7 Extended European Search Report dated Jul. 6, 2016, 8 pages.
Australian Patent Application No. 2013347917; Examination Report; dated Jan. 19, 2017.
Canadian Patent Application No. 2,950,236; Examiner's Report; dated Feb. 9, 2017.
Canadian Patent Application No. 2,911,733; Examiner's Report; dated Dec. 8, 2015.
Canadian Patent Application No. 2,911,733; Examiner's Report; dated Mar. 11, 2016.
New Zealand Patent Application No. 708296; Examiner's Report; dated Sep. 12, 2016.
New Zealand Patent Application No. 729860; Examiner's Report; dated Jun. 16, 2017.
New Zealand Patent Application No. 729860; Examiner's Report; dated Aug. 18, 2017.
U.S. Appl. No. 15/187,125; Office Action; dated Jul. 29, 2016.
European Patent Application 138574581; Examination Report; dated Jul. 21, 2017.
U.S. Appl. No. 14/318,441; Office Action; dated Jul. 25, 2014.
U.S. Appl. No. 15/671,127; Office Action; dated Mar. 5, 2018.
European Patent Application 13857458.7; Examination Report; dated Jul. 20, 2018.

* cited by examiner

TAPERED ROLL FEED

CROSS-REFERENCE TO RELATED APPLICATION

This application is a continuation of U.S. patent application Ser. No. 12/786,240, filed May 24, 2010, the entire disclosure of which is incorporated by reference herein.

TECHNICAL FIELD

Embodiments herein relate to the field of wood processing, and, more specifically, to a workpiece (e.g. lumber) feed system with tapered feed rolls to help change the speed and/or direction of a workpiece.

BACKGROUND

In current lumber processing systems, pieces of lumber are typically fed into a processing machine (e.g. a planer) in three stages. In the first stage, the pieces are conveyed on smooth chains along a conveyor toward a transfer. The pieces are crowded together to form a continuous edge to edge mat of lumber on the conveyor, with each piece oriented perpendicular to the direction of travel.

In the second stage, the transfer accepts the pieces from the conveyor. The transfer may include a plurality of rollers (e.g. pineapple rollers) rotating around an axis parallel to the first stage conveyor. As the leading piece of lumber in the mat reaches the transfer, the rollers contact the piece of lumber, abruptly changing the direction of travel by ninety degrees and accelerating the piece lineally along the transfer at a high rate of speed toward a downstream processing machine. The directional change and sudden acceleration produces large gaps between the pieces.

In the third stage, the lumber pieces are fed individually into a processing machine, such as an edger. The large gaps between successive lumber pieces reduce efficiency at the processing machine. Further, deceleration of the lead piece over a short distance can cause the following piece to collide with the lead piece. Because the following piece is traveling at a high rate of speed, such collisions can damage the pieces, cause work flow stoppages, and necessitate costly clean-ups and repairs.

For this reason, current systems require a relatively long (e.g. 40 ft.) intermediate conveyor, or "bridge," between the transfer and the processing machine. This allows sufficient distances for deceleration of the lead piece relative to the following piece, providing minimization of both gaps and collisions.

BRIEF DESCRIPTION OF THE DRAWINGS

Embodiments will be readily understood by the following detailed description in conjunction with the accompanying drawings. Embodiments are illustrated by way of example and not by way of limitation in the specification and in the accompanying drawings.

DETAILED DESCRIPTION OF DISCLOSED EMBODIMENTS

Figure 1:
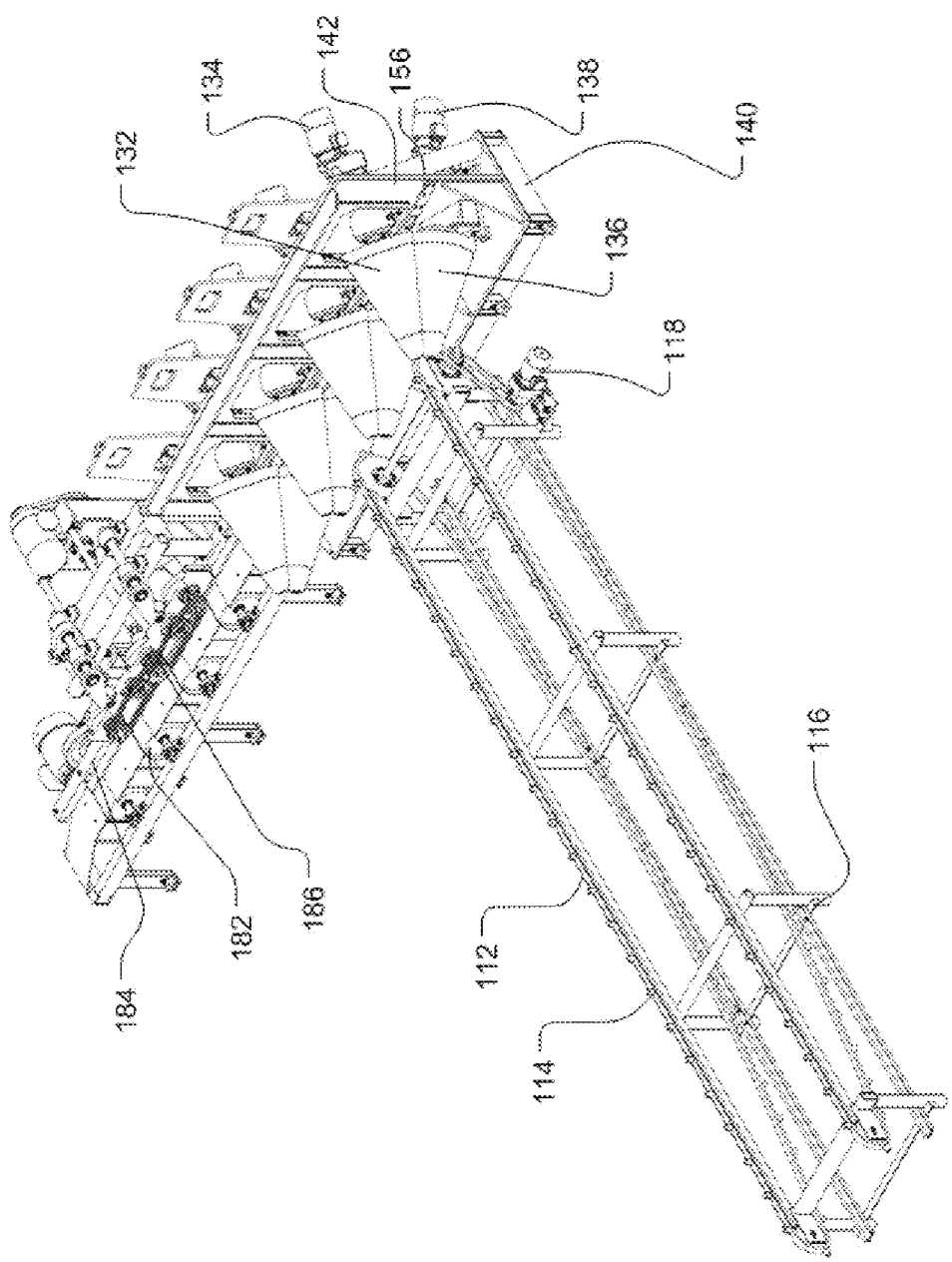
FIG. 1 illustrates a perspective view of a tapered roll feed system in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for transporting a workpiece are provided. In exemplary embodiments, a computing device may be endowed with one or more components of the disclosed apparatuses and/or systems and may be employed to perform one or more methods as disclosed herein.

As used herein, the term "workpiece" may be used to refer to any form of wood, including (but not limited to) a workpiece, a board, a flitch, a cant, a log, a slab, a stem, a panel, a taper, veneer, and/or other material such as plywood, particleboard, fiberboard, etc.

Embodiments herein provide a tapered feed roll assembly. Tapered rolls as described herein may be used with infeed and/or outfeed components, such as conveyors/transfers, to efficiently transport workpieces. In some examples, tapered feed rolls may be used with one or more lineal and/or transverse conveyors in various combinations to transport pieces of lumber into and/or from a wood processing device, including (but not limited to) a planer, edger, jointer, molder, chipper, shape saw, and/or any other workpiece cutting or surfacing apparatus. The tapering of the feed rolls as described herein may provide gradual acceleration (or deceleration) and/or directional change to workpieces (e.g. a directional change of approximately 90 degrees) while directing the workpieces toward or away from a guard/fence, as well as providing improved gap control and collision reduction without the use of a long intermediate bridge. Thus, tapered feed rolls may reduce the footprint required for workpiece processing systems. Tapered feed rolls may also increase worker safety in comparison to conventional rollers, which provide sudden acceleration and directional change.

Figure 2:
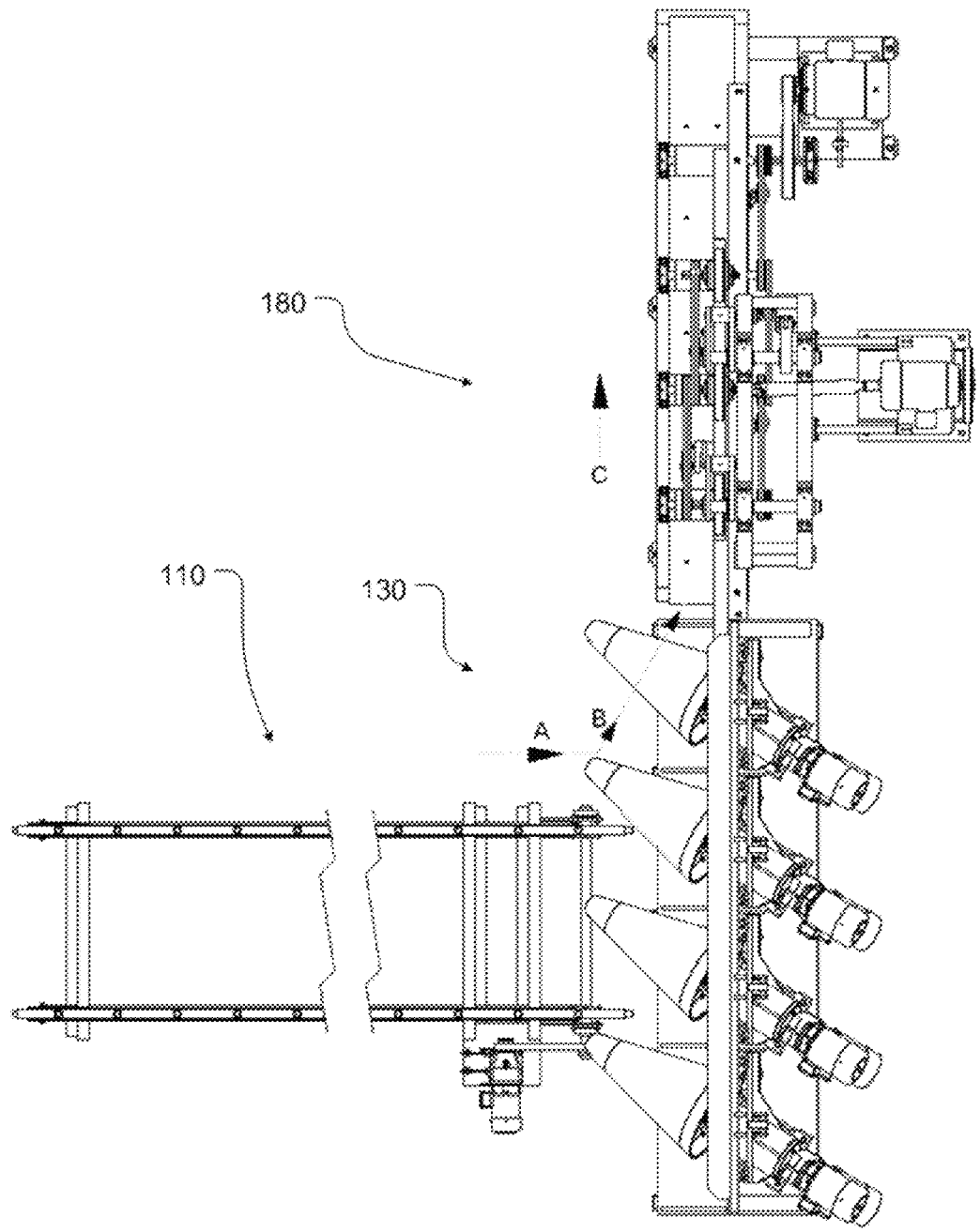
FIG. 2 illustrates a plan view of the tapered roll feed system of FIG. 1.

FIGS. 1 and 2 illustrate perspective and plan views, respectively, of a tapered roll feed system in accordance with various embodiments, where the feed rolls are being used as part of an infeed system. As best shown in FIG. 2, a tapered roll feed system may include a transverse conveyor assembly 110, tapered roll assembly 130, and lineal conveyor 180. Transverse conveyor assembly 110 may include a frame 116, a drive 118, and one or more lugged chain(s) 112 comprising lugs 114. The drive 118 may be coupled to lugged chain(s) 112 and may be configured to drive the lugged chain(s) 112. Some embodiments may include a belt, a smooth chain, or other transfer surface instead of, or in addition to, a lugged chain. The lugged chain(s) 112 may be driven at an adjustable rate of speed, allowing workpieces to be fed individually to the tapered roll assembly 130 at intervals sufficient to help prevent collisions between successive workpieces and help avoid excessive gaps between workpieces. The illustrated transverse conveyor assembly is merely one example, not intended to be limiting, and the present disclosure is intended to encompass any apparatus suitable for mechanically moving workpieces.

Tapered roll assembly 130 may include a base 140 coupled to a vertical support 142, one or more upper tapered feed rolls 132, a guide 156 coupled to vertical support 142 and side rolls 150 (see FIG. 6), and one or more lower tapered feed rolls 136. Generally, and as will be described in detail below, upper and lower tapered feed rolls 132/136 may work in conjunction with each other to change the direction and/or speed of a work piece that is entering the tapered roll assembly. In various embodiments, one or more upper feed rolls 132 may be generally conical in shape and disposed directly above a corresponding lower feed roll 136. In various other embodiments, the upper and lower feed rolls may be offset from each other. Upper feed rolls 132 may move up, down, and/or along an arcuate path, and/or may be attached to a pivoting frame. For example, base 140 and/or vertical support 142 may be pivotable.

Upper and lower tapered feed rolls 132/136 may be constructed of any suitable material, such as rubber, metal, plastic, a polymer, etc., or any combination thereof. Upper and lower tapered feed rolls 132/136 may have a surface texture or treatment for improved frictional engagement or gripping of workpieces. For example, the narrow distal end 152 and/or the wider proximal end of a tapered feed roll may be coated or textured, coated with an elastomer, etc, in order to help improve transition of the workpieces from one station to the next.

The dimensions of upper tapered feed rolls 132 and lower tapered feed rolls 136 may vary among embodiments. In one embodiment, the proximal end diameter may be four times the diameter of the distal end (i.e. proximal end to distal end ratio of 4:1; see e.g. FIG. 5). In other embodiments, the proximal end diameter may be between about 2 and 5 times the distal end diameter. In accordance with various embodiments, some tapered feed rolls may have an adjustable diameter, which may help modify the speed of the workpiece. For example, a tapered feed roll may comprise two or more conical/frustum/round plates having one or more apertures or fastening elements, allowing plates of varying diameters to be coupled together in a stack (e.g. strung onto one or more axles, etc.) to form a conical feed roll. In this example, plates of varying diameters may be added to or exchanged to alter the length, diameter, degree of tapering, etc. of the feed roll. In another example, a tapered feed roll may comprise an expandable ring within an outer end, spokes/rods connecting the expandable ring to the distal end of the tapered feed roll, and overlapping outer surface plates. In this example, the diameter of the proximal (widest) end may be increased by expanding the ring, providing an adjustable distal to proximal end diameter ratio. In a third example, one or more hollow outer shells may be fitted over a feed roll core to change the length, degree of tapering, etc.

As shown in FIG. 1, each upper tapered feed roll 132 may be coupled to and driven by an upper feed roll driver 134. Similarly, each lower tapered feed roll 136 may be coupled to and driven by a lower feed roll driver 138. Upper/lower feed roll drivers 132/134 may include any type of motor and/or other driver. In some embodiments, each upper and lower tapered feed rolls 132 and 136 may be coupled to and driven by an individual driver/motor. Some embodiments two or more feed rolls may be driven by a single driver. For example, one or more tapered feed rolls may comprise an integrated drum motor. In another example, a plurality of upper tapered feed rolls may be driven by one feed roll driver while the lower tapered feed rolls are driven by a second feed roll driver.

Upper and lower tapered feed rolls 132/136 may be positioned at an angle with respect to transverse conveyor assembly 110, fence 156, and/or vertical support 142. In one example, the feed axis of the transverse conveyor assembly 110 (i.e. vector indicated by Arrow A (in FIGS. 2 and 7B), which is the general direction of workpiece flow in the illustrated example, is approximately perpendicular to the longitudinal axis of vertical support 142 (i.e. vector indicated by Arrow C in FIGS. 2 and 7B), substantially forming a right triangle. In this example, where the direction of workpiece flow along the transverse conveyor assembly 110 (shown by Arrow A) is at 0 degrees and the direction of workpiece flow along the lineal conveyor 180 (shown by Arrow C) is at approximately 90 degrees, an upper/lower tapered feed roll 132/136 may be positioned with the axis of rotation extending at an angle of, for example, approximately 30 degrees relative to direction of workpiece flow along the transverse conveyor assembly. The angle may vary among embodiments. In the above example, the angle may be within a range of 10 to 50 degrees, etc. In some embodiments, the angle may be adjustable between 1 degree to 89 degrees. Similarly, the upper and/or lower tapered feed rolls 132/136 may be set at an angle with respect to the vertical support 142. For example, where the vertical support 142 is substantially perpendicular to base 140, the axis of rotation of an upper tapered feed roll 132 may be oblique to the horizontal longitudinal axis of vertical support 142 and/or oblique to the vertical plane of vertical support 142. As another example, the axis of rotation of an upper tapered feed roll 132 may be oblique to one or both of guide 156 and guide 184.

Lineal conveyor 180 maybe positioned adjacent to the tapered roll assembly 130 and adapted to receive workpieces being transferred by the tapered feed rolls. In various embodiments, lineal conveyor 180 may include lower rolls 182, guide 184, and a press roll assembly 186. Lower rolls 182 may be driven rolls or non-driven rolls. Press roll assembly 186 may be configured to retain workpieces on lineal conveyor 180 as they are conveyed toward the processing apparatus 190. Press roll assembly 186 may include driven or non-driven rolls and a height adjust mechanism to raise and lower the press rolls and/or the press roll assembly as desired. Other components such as a processing apparatus 190 (e.g. planer, matcher, moulder, edger, etc.), scanner/optimizer 198, computing device 194, conveyor 196, repositioner 202, and/or controller 204 may also be coupled to one or more components of lineal conveyor 180, transverse conveyor assembly 110, and/or tapered roll assembly 130 (see FIG. 8).

In various embodiments, lineal conveyor 180 may be between eight and twenty-five feet in length, or longer or shorter as needed depending on the processing required. In one example, transverse conveyor assembly 110 may be positioned such that its horizontal longitudinal axis and direction of flow are perpendicular to the horizontal longitudinal axes of tapered roll assembly 130 and lineal conveyor 180. Thus, a tapered roll feed assembly as shown in FIG. 1 may have a length of less than forty feet in a first dimension (i.e. the length of transverse conveyor assembly 110 added to the width of the tapered roll assembly 130) and less than thirty feet in a second dimension (i.e. the length of the tapered roll assembly 130 added to the length of the lineal conveyor 180). In particular, the lineal conveyor 180 may be shorter than a conventional bridge/transfer. For example, lineal conveyor 180 may be less than 20 feet in length, less than 15 feet in length, or less than 10 feet in length.

In operation, workpieces may be conveyed by lugged conveyor 112 along transverse conveyor assembly 110 toward the tapered roll assembly 130 in the direction shown by Arrow A. The workpieces may be individually separated by the lugs 114. Thus, each workpiece may be individually presented to paired upper and lower tapered feed rolls 132/136 in a transverse orientation (i.e. lengthwise, perpendicular to the direction of travel shown by Arrow A), and the narrow, distal ends 152 of upper and lower tapered feed rolls 132/136 (see e.g. FIG. 5) may contact one workpiece at a time.

As individual workpieces contact the tapered rolls, they may be driven by the tapered rolls toward the tapered roll assembly 130 and lineal conveyor 180 along an angled path shown by Arrow B. The workpieces may enter the upper and lower tapered feed rolls 132/136 at the distal (i.e. narrowest) end 152, and exit generally at or near at the proximal (i.e. widest) end 154 (see e.g. FIG. 5). The upper and lower tapered feed rolls 132/136 may be arranged at an angle to the guides 156 and/or 184. For example, as shown in FIG. 1, upper and lower tapered feed rolls 132/136 may be arranged at a 30 degree angle with respect to guide 184. The angle and tapering of the tapered rolls may cause the workpieces to be pulled toward a vertical support or guide 156 of the tapered roll assembly 130 while the workpieces substantially retain their previous orientation (i.e. with the longitudinal axis of the workpieces generally perpendicular to the direction shown by Arrow A).

As the workpieces progress from the narrow, distal ends of the tapered rolls to the wider, proximal ends of the tapered rolls, the workpieces may be gradually accelerated due to the increasing surface velocity at the wider, proximal ends of the tapered rolls. Lineal conveyor 180 may receive the workpieces from the tapered roll assembly 130 and convey the workpieces in the direction shown by Arrow C toward a processing apparatus such as a planer, edger, matcher, moulder, or other cutting/finishing machine.

Figure 3:
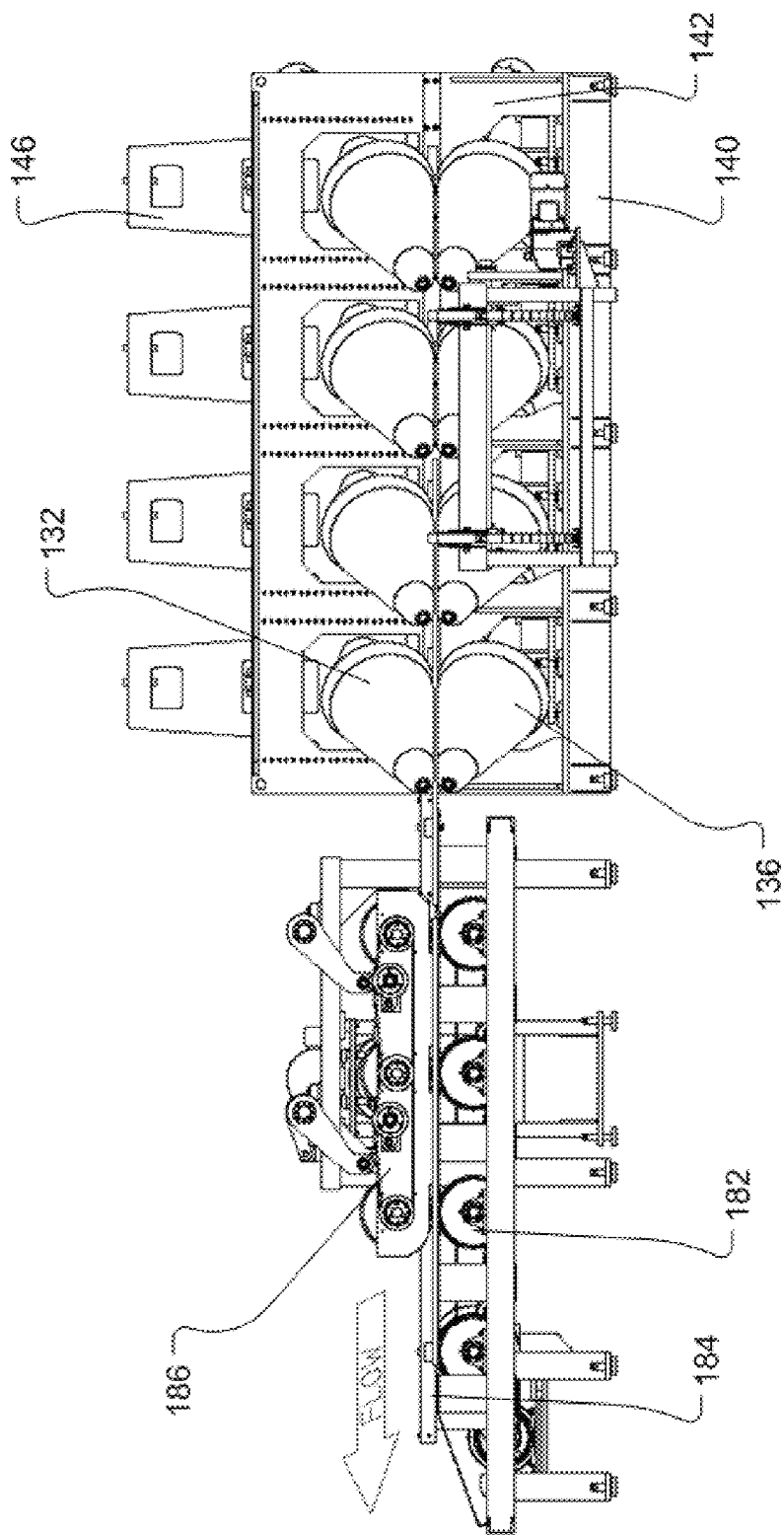
FIG. 3 illustrates a side elevational view of the lineal conveyor assembly of FIG. 1.

As shown in FIG. 3, upper tapered feed rolls 132 may be paired in vertical alignment with lower tapered feed rolls 136. The upper tapered feed rolls 132 and the lower tapered feed rolls 136 may rotate in opposite directions (i.e. clockwise and counterclockwise). The upper/lower tapered feed rolls 132/136 may be positioned such that the lower surface of the upper tapered feed rolls 132 and the upper surface of the lower tapered feed rolls 136 are substantially parallel to the upper surface of the lugged chain, leaving a gap of substantially constant height between each paired upper and lower tapered feed roll. While four pairs of tapered feed rolls are illustrated, other embodiments may include one, two, three, five, six, or more pairs. In an alternate embodiment, upper tapered feed rolls 132 and lower tapered feed rolls 136 may be vertically offset, for example with a lower tapered feed roll 136 positioned below and between two upper tapered feed rolls 132.

Figure 4:
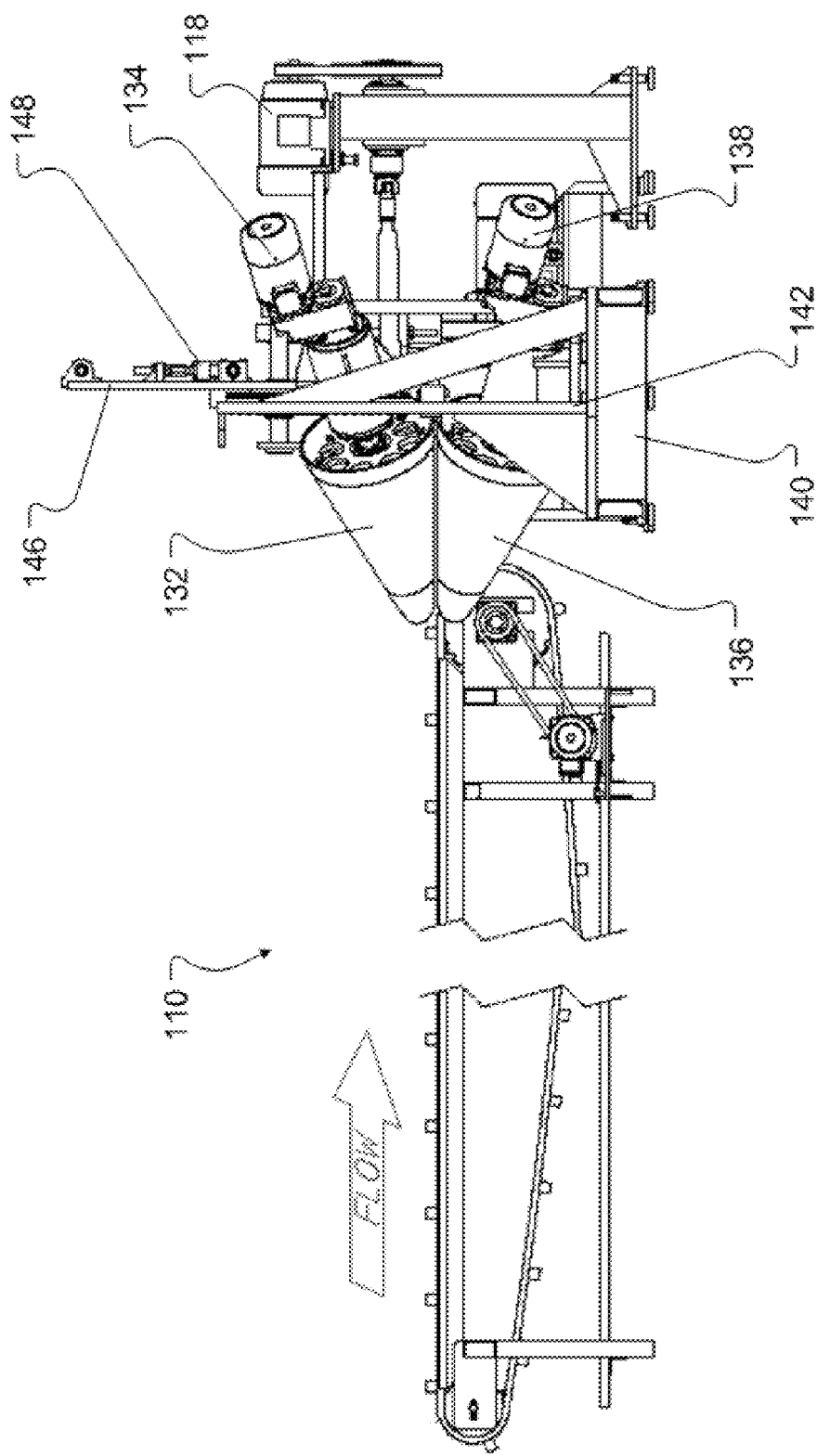
FIG. 4 illustrates a front elevational view of the transverse conveyor assembly of FIG. 1.
Figure 5:
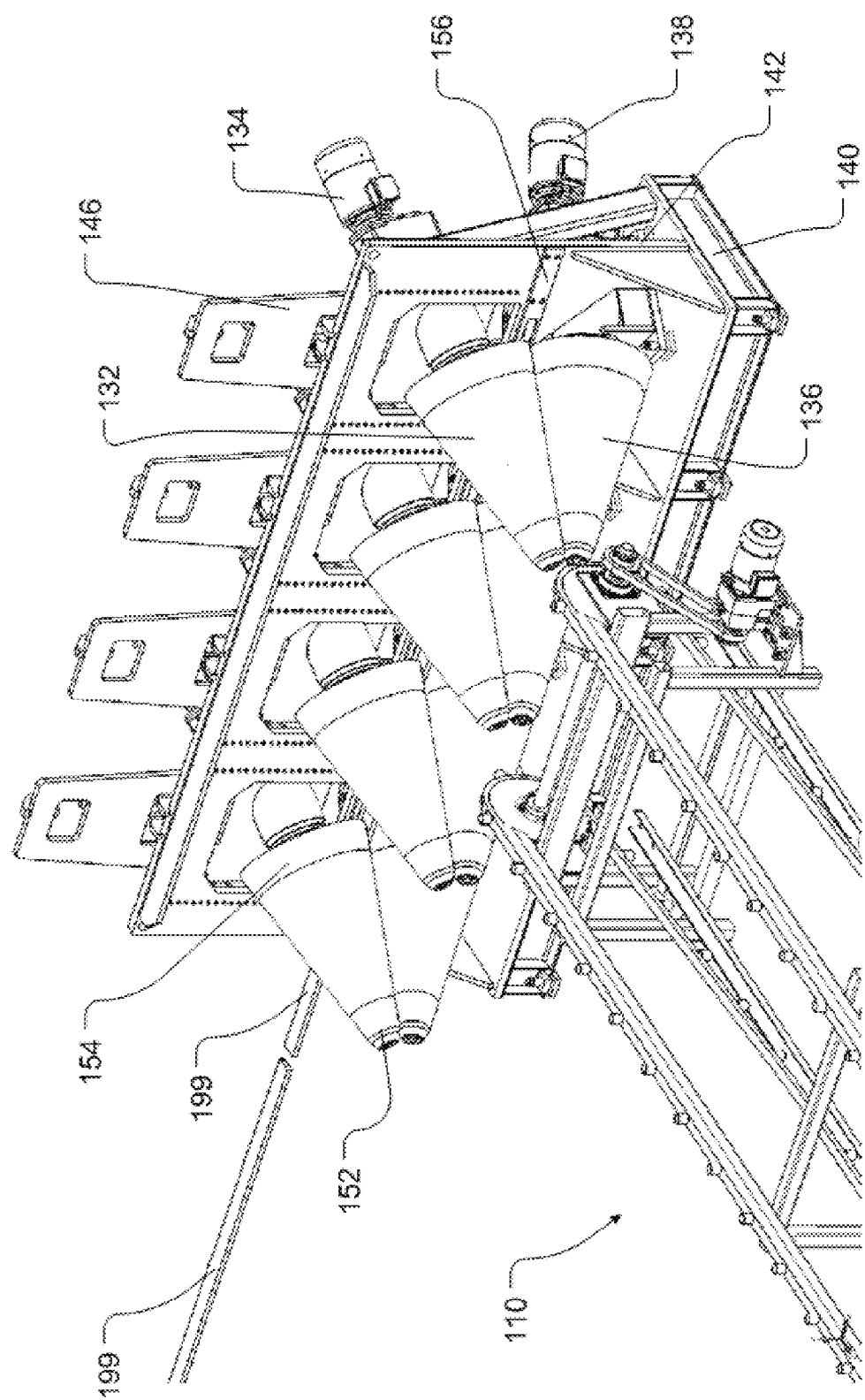
FIG. 5 illustrates a front perspective view of a tapered roll assembly and transverse conveyor assembly in accordance with various embodiment.
Figure 6:
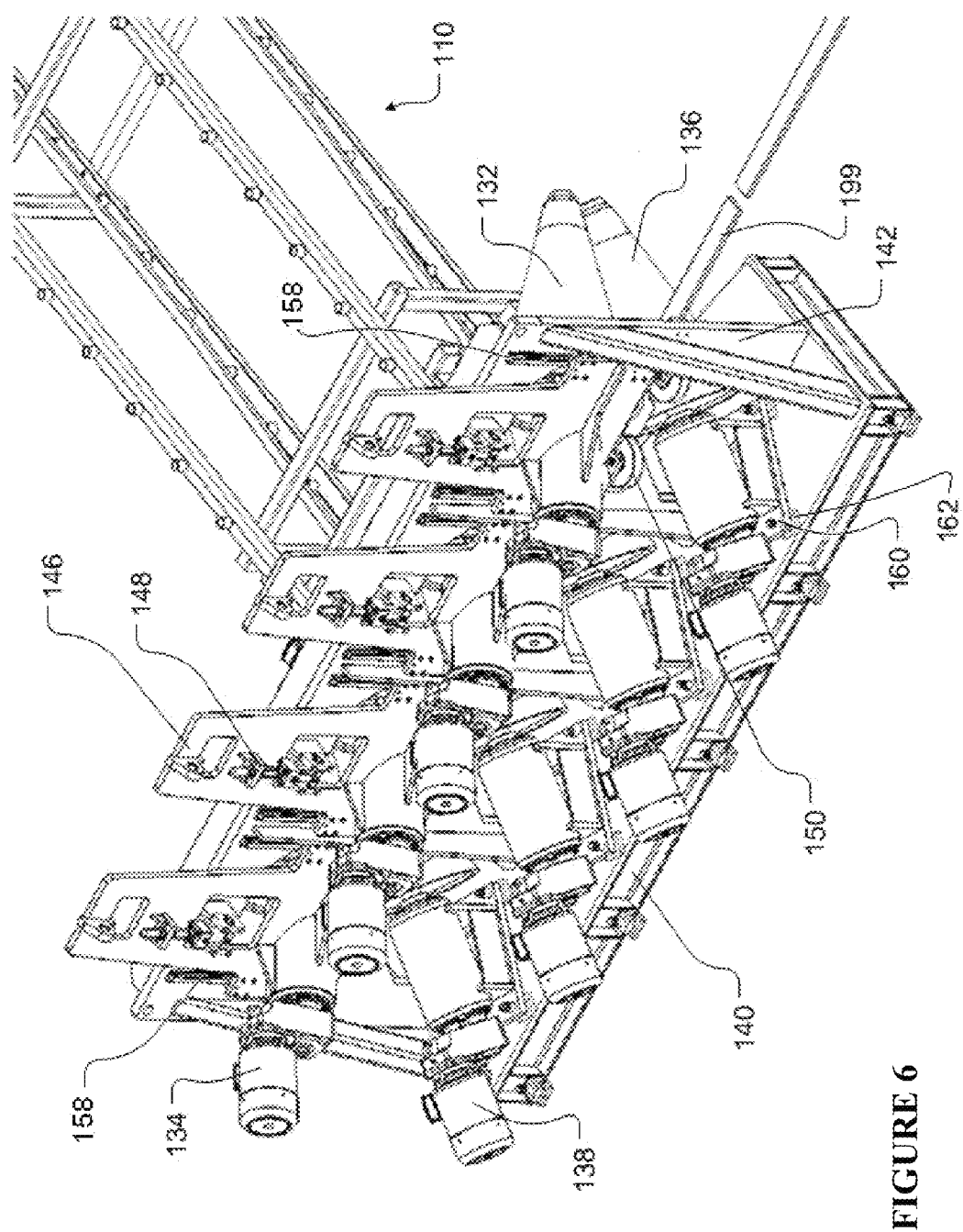
FIG. 6 illustrates a rear perspective view of the tapered roll assembly and transverse conveyor assembly of FIG. 5.

Referring now to FIGS. 4, 5 and 6, one or more plates 146 may be coupled to the vertical support 142 of the tapered roll assembly 130 to allow vertical displacement/repositioning of upper tapered feed rolls 132 relative to lower tapered feed rolls 136. In some examples, a plate 146 may be pivotable around a pivot point or along an arcuate path. As shown in the illustrated embodiment, plates 146 may be coupled to one or more upper tapered feed rolls 132 and movably coupled to tracks 158 of the vertical support 142, allowing plates 146 to be raised, lowered, pivoted, and/or moved along an arcuate path relative to vertical support 142. Tracks 158 may comprise ridges, rails, grooves, or other known movable/slideable coupling elements. An adjustment assembly 148 may be coupled to plate 146 and to vertical support 142. Adjustment assembly 148 may comprise a lift mechanism, such as a piston, configured to apply force against vertical support 142 and plates 146 to raise or lower plates 146 with respect to vertical support 142. Alternatively, adjustment assembly 148 may comprise a passive sliding mechanism that allows plates 146 to be pushed upward to accommodate workpieces as they are pulled between the tapered feed rolls, the weight of plates 146 and upper tapered feed rolls 132 applying sufficient pressure to secure the workpieces. A separate plate 146 may be provided for each upper and lower tapered feed roll pair. In some embodiments, two or more upper tapered feed rolls may be coupled to, and vertically repositionable with, a single plate 146. In some examples, two or more upper tapered feed rolls may be coupled to, and vertically repositionable with, a single plate 146.

In various embodiments, the tapered feed rolls may be laterally adjusted relative to the vertical support 142 or guide 156 by a positioner in order to modify the lateral angle of the feed roll axis. In one embodiment, the positioner may include plates 146 that are slideably coupled to one or more generally horizontal grooves or tracks of vertical support 142, which may be adapted to move laterally and adjust the angle of the feed rolls. In another embodiment, as shown in FIG. 6, a lower tapered feed roll 136 and/or lower feed roll driver 138 may be coupled to a positioner, which may include a positioning base 160. Positioning base 160 may further comprise one or more couplers 162. Couplers 162 may couple the positioning base 160 to the base 140 and/or to the vertical support 142. Couplers 162 may be moveably (e.g. slideably/pivotably) coupled to base 140 and/or vertical support 142. In one example, couplers 162 may comprise a cam and cam follower arrangement, or a vertical rod/post in sliding engagement with a corresponding groove or track of base 140. Such a groove or track may be curved to allow repositioning of the positioning base 160 along an arcuate path, such that the axis of rotation of the corresponding tapered feed roll may be adjusted to form any desired angle with respect to the longitudinal axis of the vertical support 140. In other examples, couplers 162 may comprise bearings, tracks/grooves, and/or other movable coupling elements.

Figure 8:
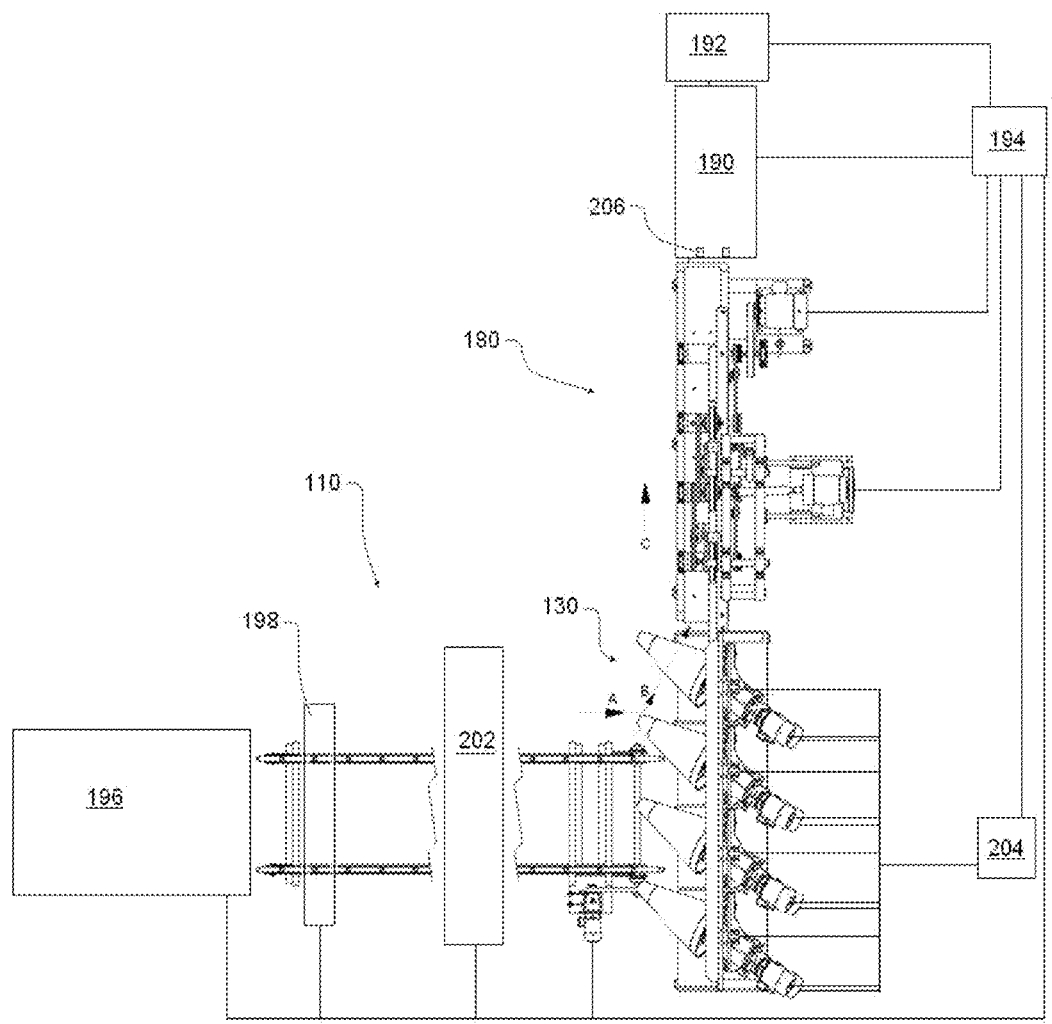
FIG. 8 is a block diagram illustrating an optimizing tapered roll feed system.

The positioners may be coupled to, and operated/controlled by, a controller and/or other device (e.g. controller 204, computing device 194, controller 204, processing apparatus 190, etc., see FIG. 8). In one example, positioner may comprise an actuator configured to adjust the vertical/horizontal position of a positioner (e.g. positioning base 160 or plates 146) in response to a command from the controller and/or other device to adjust the horizontal and/or vertical orientation of the corresponding tapered feed roll. Two or more tapered feed rolls and/or positioning bases 160 may be coupled to allow synchronous adjustment of tapered feed rolls.

Figure 7A:
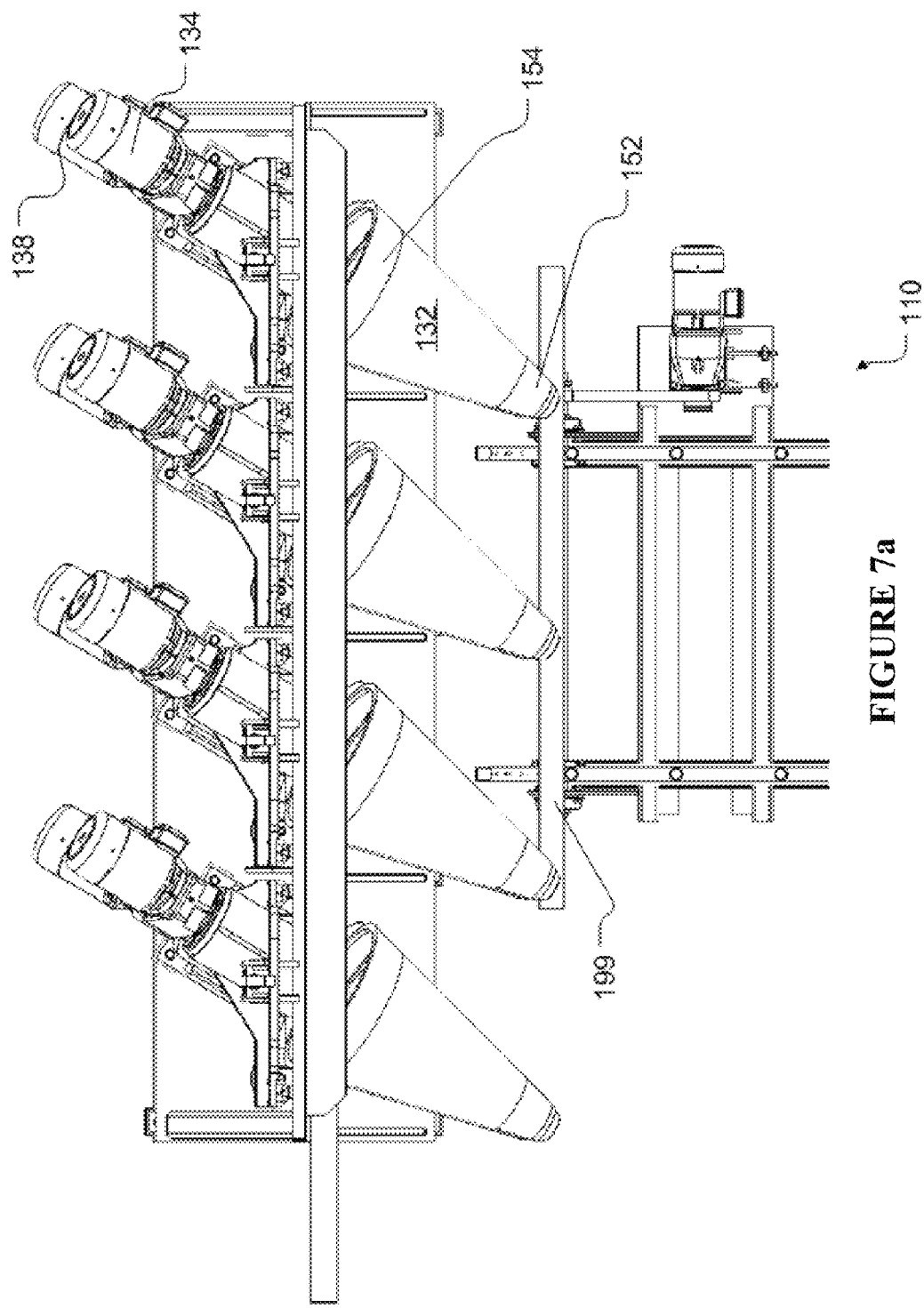
FIGS. 7a and 7b illustrate plan views of an transverse conveyor assembly and tapered roll assembly.
Figure 7B:
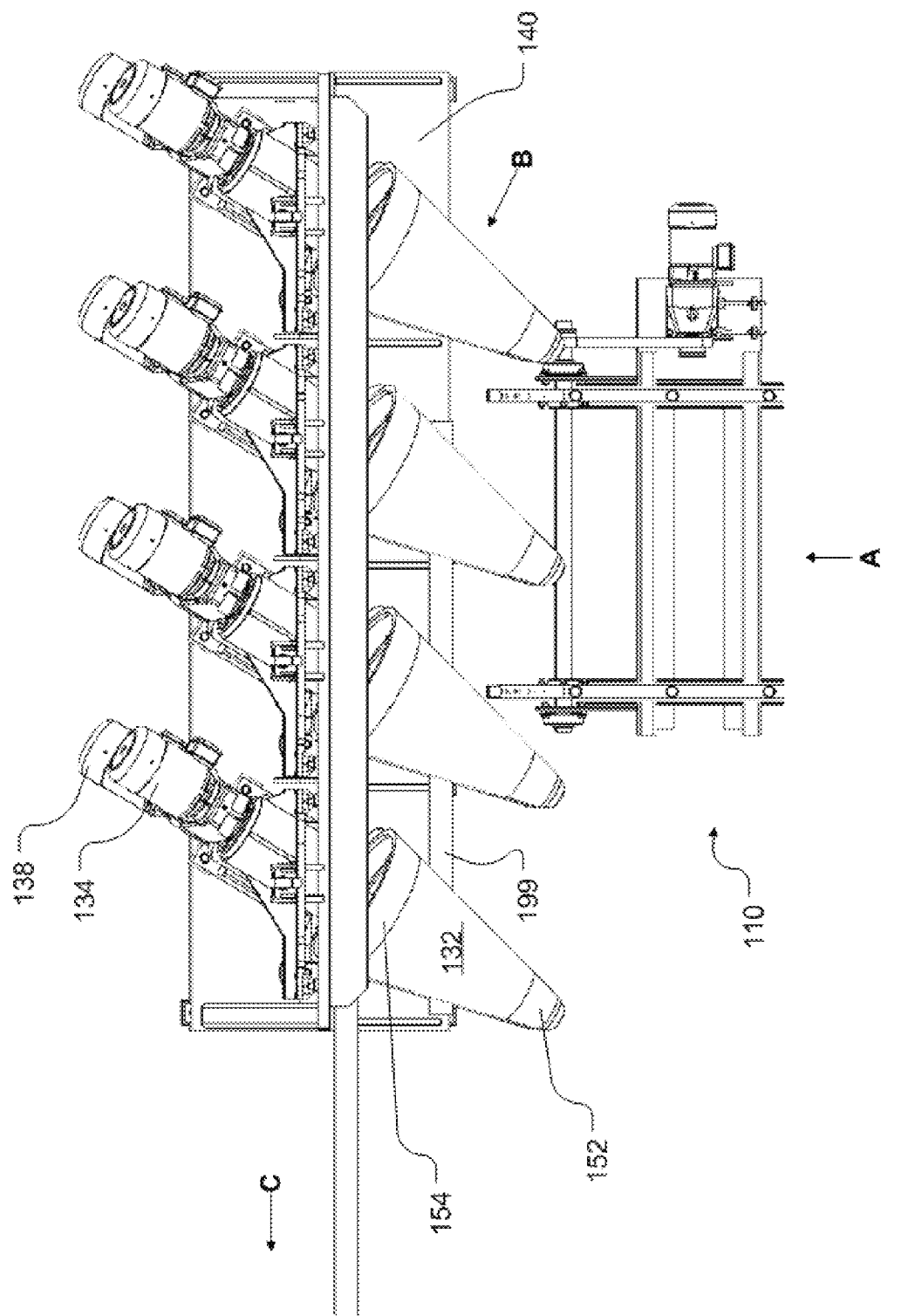

FIGS. 7a and 7b illustrate plan views of a transverse conveyor assembly and a tapered roll assembly. As shown in FIG. 7a, a workpiece 199 may be conveyed on transverse conveyor assembly 110 toward the tapered roll assembly 130 and into contact with the distal ends 152 of the tapered feed rolls.

As a workpiece 199 contacts the distal ends 152 of upper and lower tapered feed rolls 132/136, the workpiece 199 may be pulled toward the proximal ends 154 of the upper and lower tapered feed rolls 132/136 (direction shown by Arrow A, FIG. 7b) due to the angle of the tapered feed rolls 132/136. At the same time, the rotation of upper and lower tapered feed rolls 132/136 may also propel the workpiece toward the lineal conveyor 180 (direction shown by Arrow C, FIG. 7b). As a result, the workpiece may move along a path of flow that is perpendicular to the rotational axes of the upper and lower tapered feed rolls 132/136. For example, where the upper and lower tapered feed rolls 132/136 are angled at 30 degrees with respect the vector indicated by Arrow A, the workpiece may move in the direction indicated by Arrow B. The workpiece may substantially maintain its orientation, with the longitudinal axis approximately parallel to the vector indicated by Arrow A, during this process.

The surface speed of the tapered rollers is greater at proximal ends 154 than at distal ends 152. Thus, the tapered rollers may gradually accelerate the workpiece 199 as it proceeds toward the proximal ends 154 and toward a guide (e.g. guide 184 and/or guide 156, shown in FIG. 1).

Guide 184 may comprise a fixed straight edge lumber guide that positions each workpiece for feeding into a processing device. For example, guide 184 may align workpieces with one or more positioning or cutting components of a planer. When the workpiece 199 reaches guide 184 and/or 156, the upper and lower tapered feed rolls may continue to crowd the workpiece along guide 184. The workpiece will then be traveling in a lineal fashion, parallel to the vector indicated by Arrow C.

The rotational speeds of the upper/lower tapered feed rolls may be adjustable to accelerate the workpiece 199 to travel along the lineal conveyor 180 at a rate matching that of a processing apparatus (e.g. processing apparatus 190). For example, the rotational speeds of upper/lower tapered feed rolls 132/136 may be adjusted to cause the workpiece 199 to travel along the lineal conveyor 180 at a speed that matches the cutting speed of a planer coupled to lineal conveyor 180. The rotational speeds of upper/lower tapered feed rolls 132/136 may also be adjusted to increase or decrease gaps between successive workpieces on lineal conveyor 180.

FIG. 8 is a block diagram illustrating an optimizing workpiece feed system, arranged in accordance with various embodiments. An optimizing workpiece feed system may include transverse conveyor assembly 110, tapered roll assembly 130, and lineal conveyor 180 essentially as described above. The system may further include a conveyor 196, a repositioner 202, and a scanner/optimizer 198 operatively coupled to transverse conveyor assembly 110. A processing apparatus 190 may be operatively coupled to, and positioned to accept workpieces from, lineal conveyor 180. An outfeed 192 may be operatively coupled to, and positioned to accept workpieces from, processing apparatus 190. A computing device 194 may be coupled to one or more of these or other components (see e.g. FIG. 8). A controller 204 may be coupled to one or more components of tapered roll assembly 130, scanner/optimizer 198, and/or computing device 194. One or more of scanner/optimizer 198, computing device 194, and controller 204 may be integrated within a single device.

Conveyor 196 may comprise any workpiece storage/transport device, including but not limited to a belt/chain, rollers, table/platform, etc. Repositioner 202 may comprise any device for removing workpieces from a path of flow by diverting, ejecting, or otherwise dislocating the workpieces from the path of flow (e.g. a ducker, a stopper, a dropout mechanism, etc.). In some examples, repositioner 202 may be any device configured to flip and/or rotate a workpiece to a desired orientation (e.g. from wane down to wane up) based on scan data, a command, and/or manual activation. Repositioner 202 may be positioned in any suitable location, such as within, before, or after the transverse conveyor assembly 110. For example, repositioner 202 may be disposed between the transverse conveyor assembly 110 and the tapered roll assembly 130. As another example, repositioner 202 may be located between the tapered roll assembly 130 and the lineal conveyor 180. In still another example, repositioner 202 may be located along/after the lineal conveyor 180 and before the processing apparatus 190.

Scanner/optimizer 198 may also be disposed within, before, or after the transverse conveyor assembly 110. For example, scanner/optimizer 198 may be positioned along conveyor 196 or between conveyor 196 and transverse conveyor assembly 110. Scanner/optimizer 198 may comprise a lineal scanner, a transverse scanner, and/or one or more cameras or other imaging devices, any or all of which may be arranged above, below, or to the side of a path of workpiece flow. Scanner/optimizer 198 may scan of individual workpieces on the transverse conveyor assembly 110, generate corresponding scan data, and send the scan data to one or more other components. The scan data may be used to determine one or more characteristics of a workpiece (e.g. physical dimensions, contours, color, species, grain angle, density, pith, pitch, rot, shelling, knots, wane, curvature/ bow, warp, moisture content, shake, wet pockets, insect damage, and/or other defects) that may be used to generate an optimized processing solution for the workpiece.

Processing apparatus 190 may be a planer, matcher, moulder, edger, shape saw, and/or any other processing device. Processing apparatus 190 may include one or more movable elements 206 that are repositionable to accommodate variations in workpiece size, cutting/processing patterns, etc. Movable elements 206 may be workpiece positioners, cutting/planing/routing elements, chipping heads, or other elements.

Controller 204 may be configured to adjust the angle and/or rotational speed of one or more tapered feed rolls 132/136, individually or in groups of two or more, in response to a command from scanner/optimizer 198 and/or computing device 194. This adjustment may be automatic, and may be based on factors such as size of gaps between successive workpieces, workpiece sizes, processing apparatus speed and/or time required to adjust a processing apparatus for processing a workpiece, etc. In some examples, controller 204 may be configured to facilitate manual adjustment/setting of tapered feed roll rotational speed, angle, and/or vertical position.

Scanner/optimizer 198 and/or computing device 194 may include a processor, a memory storing one or more algorithms, and computer executable instructions operable, upon execution, to implement the stored algorithms. Examples of a stored algorithm may include, but are not limited to, algorithms for: generating one or more optimized processing (e.g. cutting, planing, edging, or finishing) solutions for a scanned workpiece based on scan data; predicting/determining a gap size between successive workpieces on transport 180; adjusting a gap between successive workpieces (e.g. by assessing the rotational speed of a tapered feed roll and the length of the gap, determining a corrective adjustment to the rotational speed, and sending a command to the corresponding feed roll drive to make the corrective adjustment); controlling/adjusting/coordinating the operation of system components to reduce gaps between workpieces based on one or more of scan data, optimized processing solutions, workpiece processing speed of the processing apparatus, etc.; sending a command to reposition or drop out a workpiece based on scan data; monitoring and adjusting the rotational speed, angle, and/or position of a tapered feed roll; and/or adjusting operation of the processing apparatus 190 based on an optimized processing solution (e.g. by sending a command to the processing apparatus 190 to reposition one or more movable elements of the processing device based on a processing solution for a workpiece on lineal conveyor 180).

In some embodiments, processing apparatus 190 may be an optimizing processing device such as an optimizing planer, optimizing edger, or optimizing matcher/moulder and may comprise some or all of the functions of computing device 194. Processing apparatus 190 may accept workpieces from lineal conveyor 180 and process each workpiece according to an optimized processing solution/pattern received from the scanner/optimizer 198. Processing apparatus 190 may be configured to adjust or regulate the operation of other components of the system, as described above with respect to computing device 194.

In an example operation, workpieces may be conveyed to the transverse conveyor assembly 110 on conveyor 196. The workpieces may be individually scanned by scanner/optimizer 198 before, during, or after the transfer of workpiece to the transverse conveyor assembly 110. Scan data may be sent to the computing device 194, the controller 204, and/or repositioner 202. For example, scanner/optimizer 198 may send scan data for a workpiece to computing device 194, and computing device 194 may determine that the scan indicates a defect that renders the workpiece unsuitable for further processing. Computing device 194 may then send a command signal to repositioner 202. In response to the command signal, repositioner 202 may remove the defective workpiece from the lugged chain 112. Scanner/optimizer 198 may determine an optimized processing solution (e.g. optimized planing/cutting/edging solution) and/or optimized processing pattern for each workpiece scanned. The optimized processing solution/pattern may be sent to the computing device 194, repositioner 202, and/or controller 204.

Workpieces may be conveyed along transverse conveyor assembly 110 and into contact with one or more upper and lower tapered feed rolls of tapered roll assembly 130 as described above. The upper tapered feed rolls 132 may be raised or lowered based on the scan data (e.g. based on workpiece thickness, etc.). Adjustment assemblies 148 may be coupled to controller 204, scanner/optimizer 198, and/or computing device 194, and may be configured to raise or lower the upper tapered feed rolls 132 in response to a command from one or more of those components.

The workpieces may be accelerated by the upper and lower tapered feed rolls and conveyed along lineal conveyor 180 toward the processing apparatus 190. Press roll assembly 186 may apply downward force to retain the workpieces on the transfer surface as they move along the guide 184. Press roll assembly 186 may include one or more driven rollers operable to adjust the speed of individual workpieces. In one example, press roll assembly 186 may reduce or increase the speed of a workpiece in response to a command and/or to accommodate the processing speed of the processing apparatus 190.

Computing device 194 may adjust the gaps between successive workpieces and/or adjust workpiece infeed into processing apparatus 190 by sending commands to control the operation of one or more of conveyor 196, scanner/optimizer 198, drive 118, upper/lower feed roll driver 134/138, adjustment assembly 148, press roll assembly 186, lineal conveyor 180, and/or processing apparatus 190. In one example, computing device 194 may issue a command to adjust the rotational speed of upper/lower tapered feed rolls 132/136 based at least in part on one or more optimized processing solutions/patterns. Computing device 194 may also issue a command to adjust the rotational speed of upper/lower tapered feed rolls 132/136 to leave gaps between workpieces sufficient to allow repositioning of movable elements 206 according to the optimized cut solution/pattern for a workpiece on lineal conveyor 180. Computing device 194 may transmit one or more commands to processing apparatus 190, such as a command to reposition movable elements 206 according to the optimized cut solution/pattern for a workpiece on lineal conveyor 180.

The processing apparatus 190 may process one or more workpieces as they enter. As workpieces exit processing apparatus 190, the workpieces may be transferred to an outfeed 192. In some embodiments, outfeed 192 may comprise one or more upper/lower tapered feed rolls arranged/controlled substantially as described above for tapered roll assembly 130. In one example, outfeed 192 may comprise a combination of a conveyor and a tapered roll assembly. The upper/lower tapered feed rolls of outfeed 192 may be configured to reduce, increase, change, or otherwise control the speed and/or direction of the workpieces exiting the processing apparatus 190. An outfeed with tapered feed rolls may be disposed in any suitable location along a path of workpiece flow, such as between conventional conveyors and/or before a second processing apparatus.

Figure 9:
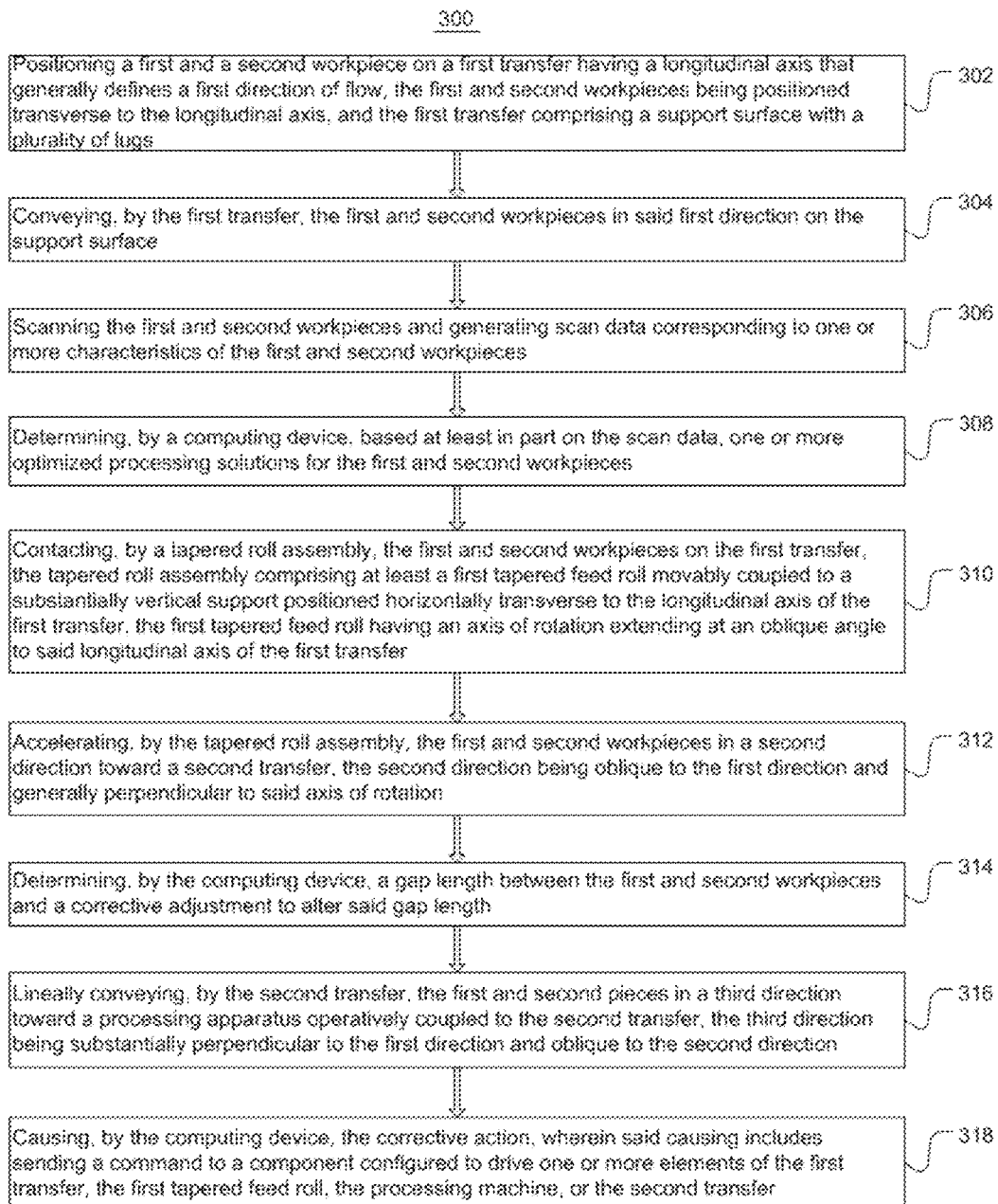
FIG. 9 is a flow chart illustrating a method of manipulating workpieces, such as controlling gaps and/or changing workpiece flow from transverse to lineal and vice versa.

FIG. 9 illustrates a method of manipulating workpieces, such as controlling gaps and/or changing workpiece flow from transverse to lineal and vice versa, arranged in accordance with various embodiments. Method 300 may begin at block 302, "Positioning a first and a second workpiece on a first transfer having a longitudinal axis that generally defines a first direction of flow, the first and second workpieces being positioned transverse to the longitudinal axis, and the first transfer comprising a support surface with a plurality of lugs." The first transfer may comprise any workpiece transfer/conveyance known in the art. For example, transverse conveyor assembly 110 may be the first transfer, and the support surface may include one or more of lugged chains 112. Workpieces may be placed onto the first transfer by any suitable method. The first and second workpieces may be spatially separated on the support surface by one or more lugs or other spacing element(s), with the longitudinal axis of each workpiece extending transverse/perpendicular to the longitudinal axis of the first transfer. Some embodiments may omit block 302, and may begin with block 304.

From block 302, the method may proceed to block 304, "Conveying, by the first transfer, the first and second workpieces in said first direction on the support surface." The first transfer may be driven (e.g. by drive 118 or other mechanism) to transport the workpieces in the first direction (i.e. the first direction of flow). Thus, the workpieces may travel along the first transfer in a broadside or transverse orientation, with the longitudinal axis of each workpiece substantially perpendicular/transverse to the direction of travel.

From block 304, the method may proceed to block 306, "Scanning the first and second workpieces and generating scan data corresponding to one or more characteristics of the first and second workpieces." A scanner (e.g. scanner/optimizer 198) may be positioned before, after, or along the first transfer as described above with reference to FIG. 8. Workpieces may be individually scanned by the scanner, which may generate scan data corresponding to one or more characteristics of each workpiece as described above. Generating scan data may include sending the scan data to another device (e.g. computing device 194, controller 204, processing apparatus 190, etc.).

From block 306, the method may proceed to block 308, "Determining, by a computing device, based at least in part on the scan data, one or more optimized processing solutions for the first and second workpieces." The computing device may be a standalone computing device (e.g. computing device 194). Alternatively, the computing device may be processing apparatus 190, scanner/optimizer 198, controller 204, and/or any combination thereof. The computing device may be a combination of two or more system components, and the determining may be performed partially by one of the devices and partially by another. For example, where the computing device comprises scanner/optimizer 198 and computing device 194, the scanner/optimizer 198 may determine a first optimized processing solution based at least in part on the scan data, and the computing device 194 may determine a second optimized processing solution for the same workpiece based at least in part on an operational parameter such as gap size, first transport speed, rotational speed of one or more tapered rollers, time required to reposition a downstream processing apparatus, etc. This may increase efficiency by allowing adjustment of processing solutions to accommodate changing operational parameters. Some embodiments may omit block 306 and/or 308, proceeding from block 304 to block 308 or 310.

From block 308, the method may proceed to block 310, "Contacting, by a tapered roll assembly, the first and second workpieces on the first transfer, the tapered roll assembly comprising at least a first tapered feed roll movably coupled to a substantially vertical support, the support positioned horizontally transverse to the longitudinal axis of the first transfer, the first tapered feed roll having an axis of rotation extending at an oblique angle to said longitudinal axis of the first transfer.'" The tapered roll assembly may be a tapered roll assembly 130. The first tapered feed roll may be upper tapered feed roll 132, lower tapered feed roll 136, and/or a pair of feed rolls (e.g. paired upper tapered feed roll 132 and lower tapered feed roll 136). The support may be vertical support 142 or any other suitable support element. The support may be oriented generally perpendicular to, or at an oblique angle to, the first direction and/or first transport. The first tapered feed roll may be positioned as described above with reference to FIGS. 4-6. The first tapered feed roll may have a narrower distal end and a proximal wider end, with the distal end extending toward the first transfer. The first tapered end may be positioned to contact a workpiece at or near the end of the first transport, and the rotation and tapered shape of the first tapered feed roller may pull the workpiece from the first transfer.

From block 310, the method may proceed to block 312, "Accelerating, by the tapered roll assembly, the first and second workpieces in a second direction toward a second transfer, the second direction being oblique to the first direction and generally perpendicular to said axis of rotation." The rotation of the first tapered feed roll may apply force to the workpiece in a direction perpendicular to the axis of rotation, which may cause the workpiece to move in the second direction. The workpiece may remain substantially oriented in a transverse position with respect to the first transfer as it is engaged by the tapered roll assembly and is driven in the second direction by the tapered roll assembly. As the workpiece is pulled toward the proximal end of the first tapered feed roll, the surface speed gradually increases due to the increasing feed roll diameter.

From block 312, the method may proceed to block 314, "Determining, by the computing device, a gap length between the first and second workpieces and a corrective adjustment to alter said gap length." As described above, a computing device (e.g. computing device 194, a scanner, an optimizer, a controller, etc.) may be endowed with one or more algorithms and executable instructions operable, when executed, to determine/predict gap sizes and determine corrective adjustments. Corrective adjustments may include adjustments to one or more components of the system (e.g. a driver, a controller, movable element of a processing apparatus, etc.) to increase or decrease conveyor speed, feed roll rotational speed, feed roll angle, press roll/lower roll rotational speed, vertical height of upper feed rolls, etc., and/or to reposition a movable element of a processing machine.

From block 314, the method may proceed to block 316, "Lineally conveying, by the second transfer, the first and second workpieces in a third direction toward a processing apparatus operatively coupled to the second transfer, the third direction being substantially perpendicular to the first direction and oblique to the second direction." The second transfer may be any suitable workpiece transfer/conveyor, such as lineal conveyor 180. The first and second workpieces may be sequentially conveyed by the second transfer into a processing apparatus, such as processing apparatus 190. The second transfer may include one or more powered or non-powered rollers, such as hold-down rollers, and one or more guides or fences to align the workpieces during conveyance.

From block 316, the method may proceed to block 318, "Causing, by the computing device, the corrective action, wherein said causing includes sending a command to a component configured to drive one or more elements of the first transfer, the first tapered feed roll, the processing machine, or the second transfer." As described above with reference to FIG. 8, the computing device may determine a corrective action to adjust or set a gap length between workpieces and/or accommodate an optimized processing solution. In some examples, the corrective action may include generating a new optimized processing solution, sending a command to a drive or other system component to make an operational adjustment (e.g. to adjust speed, remove or reposition a workpiece, reposition a movable element of a processing apparatus, etc.).

Alternatively, the first transfer may be a lineal conveyor and the second transfer may be a transverse conveyor. Thus, the workpieces may travel lineally in the first direction along the lineal conveyor toward a tapered roll assembly. The workpieces may be engaged by the tapered feed rolls and pushed away from a guide/fence toward a transverse conveyor. For example, referring to FIG. 2, the direction of flow may be essentially reversed. The workpieces may begin traveling along lineal conveyor 180 (in the opposite direction of Arrow C) toward tapered roll assembly 130. The workpieces may individually engage the proximal end of a tapered feed roll, which may drive/push each workpiece along the path of flow (but in the opposite direction) indicated by Arrow B. As the workpieces move toward the distal ends of the tapered feed rolls, the workpieces may be transferred onto a transverse conveyor, such as transverse conveyor assembly 110, or other conveyance. In some examples, two or more tapered feed roll assemblies may be provided as described below with respect to FIG. 10.

Figure 10:
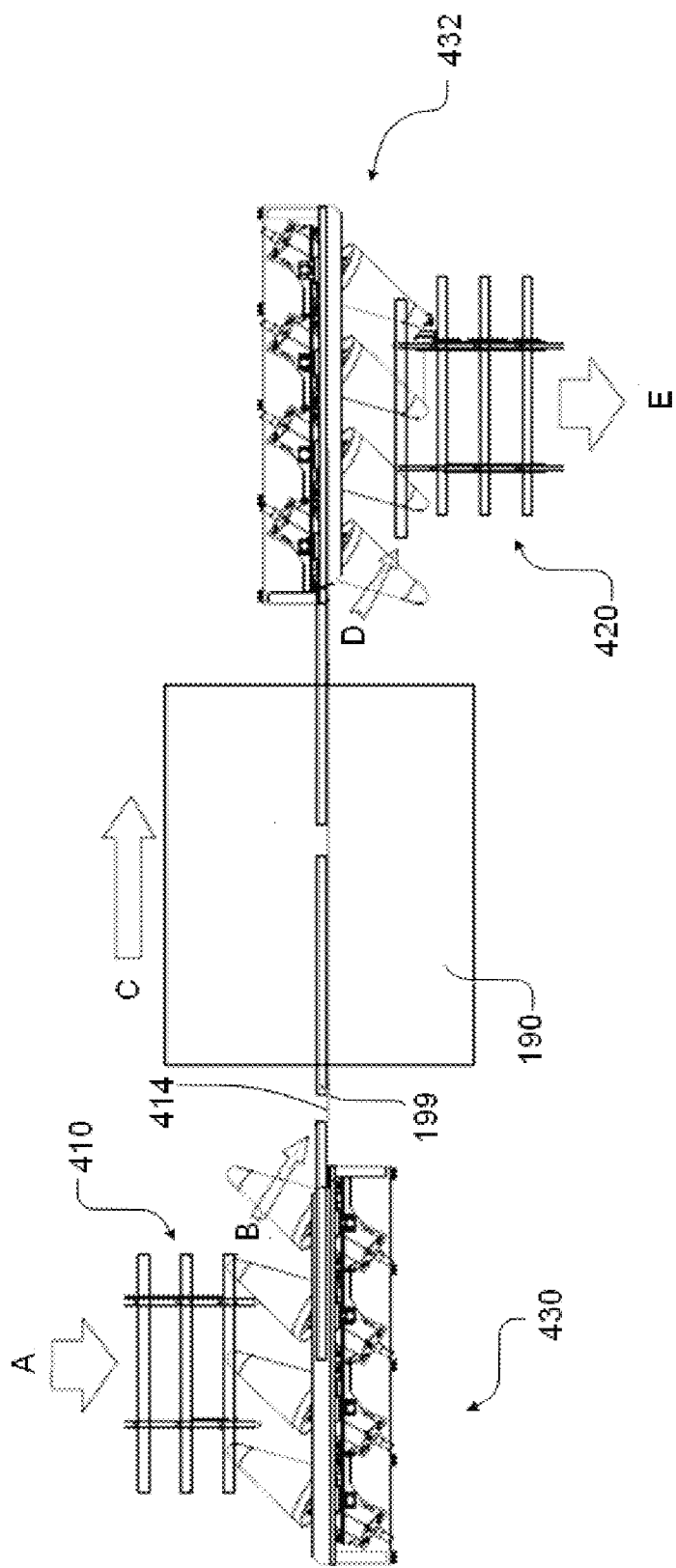
FIG. 10 illustrates a plan view of a tapered roll feed system, all arranged in accordance with various embodiments.

FIG. 10 illustrates a plan view of a tapered roll feed system with a first transverse conveyor 410, a first tapered fee roll assembly 430, a guide 414, a processing apparatus 190, a second tapered feed roll assembly 432, and a second transverse conveyor 420. First and second tapered feed roll assemblies 430/432 may be configured essentially as described above with respect to tapered feed roll assembly 130. First and second transverse conveyors 410/420 may be configured essentially as described above with respect to transverse conveyor assembly 110. Guide 414 may extend from first tapered feed roll assembly 430 toward and/or at least partially through processing machine 190 to guide the positioning of workpieces for processing.

In operation, a workpiece 199 may be transported by transverse conveyor 410 in the direction indicated by Arrow A toward first tapered feed roll assembly 430. First tapered feed roll assembly 430 may drive and/or accelerate the workpiece 199 in the direction indicated by Arrow B and against guide 414 in the manner described above. Workpiece 199 may be transported lineally in the direction indicated by Arrow C through processing machine 190, where it may be processed (e.g. planed, edged, cut, etc.). As workpiece 199 exits processing machine 190, workpiece 199 may be engaged by second tapered feed roll assembly 432 and driven and/or decelerated in the direction indicated by Arrow D. Workpiece 199 may be deposited by second tapered feed roll assembly 432 onto second transverse conveyor 420, which may transport workpiece 199 in the direction indicated by Arrow E.

Thus, one or more tapered feed roll assemblies may be arranged with one or more conveyors, guides, and/or processing machines in various configurations to provide a system to control workpiece flow, speed, orientation, and/or direction of flow. In some examples, a tapered feed roll assembly may be provided upstream of a processing machine or other system component and may be used to control the direction and/or speed of workpieces as they approach a processing machine. A tapered feed roll assembly may also/instead be provided downstream of a processing machine or other system component and may be used to control the direction and/or speed of workpieces as they exit the processing machine.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A feed roll assembly, comprising:
a support having a guide surface that extends longitudinally along a first side of the support;
a first feed roll extending outwardly from the first side of the support and spaced apart from a second feed roll by a gap, the first and second feed rolls positioned to engage generally opposite first and second longitudinal sides, respectively, of the workpieces, the first feed roll having a proximal end, a distal end, and a first axis of rotation, the diameter of the proximal end being greater than the diameter of the distal end, and the first axis of rotation being laterally skewed relative to the guide surface;
wherein the first feed roll and the second feed roll are collectively operable to drive successive ones of the workpieces through said gap in substantially an initial workpiece orientation in a direction of travel that is transverse to the guide surface, and
wherein the guide surface is positioned to engage a third longitudinal side of successive ones of the workpieces entering or exiting the gap between the proximal end of the first feed roll and the second feed roll.

2. The feed roll assembly of claim 1, wherein the second feed roll is coupled to the support and positioned generally above the first feed roll, the second feed roll having a second axis of rotation that is laterally skewed relative to the guide surface.

3. The feed roll assembly of claim 1, the first feed roll being tapered with a generally constant decrease in diameter from the proximal end to the distal end.

4. The feed roll assembly of claim 3, the diameter of the proximal end being at least twice the diameter of the distal end.

5. The feed roll assembly of claim 2, the first feed roll having a first workpiece engaging surface and the second feed roll having a second workpiece engaging surface, the first and second workpiece engaging surfaces defining the gap between the first and second feed rolls.

6. The feed roll assembly of claim 5, wherein the gap extends from the distal end of the first feed roll to the proximal end of the first feed roll.

7. The feed roll assembly of claim 6, wherein the gap has a generally constant vertical height from the distal end to the proximal end.

8. The feed roll assembly of claim 6, wherein the gap has a greater vertical height at the distal end than at the proximal end.

9. The feed roll assembly of claim 1, further including a first drive and a second drive, the first drive coupled to the first feed roll and the second drive coupled to the second feed roll, the first drive configured to rotate the first feed roll around the first axis of rotation in a first rotational direction and the second drive configured to rotate the second feed roll in a second rotational direction opposite to the first rotational direction.

10. The feed roll assembly of claim 9, wherein the first drive comprises a first motor and the second drive comprises a second motor.

11. The feed roll assembly of claim 1, further including an adjustment assembly coupled to the first feed roll and the support, wherein the adjustment assembly is configured to raise or lower the first feed roll relative to the guide surface.

12. The feed roll assembly of claim 11, the adjustment assembly further including a plate member coupled to the first feed roll and movably coupled to the support, and an actuator operable to raise or lower the plate member to thereby raise or lower the first feed roll.

13. The feed roll assembly of claim 12, wherein the actuator comprises a piston.

14. The feed roll assembly of claim 1, wherein the first feed roll is repositionable to adjust a lateral skew angle of the first axis of rotation relative to said guide surface.

15. The feed roll assembly of claim 14, wherein the feed roll assembly further includes a controller operatively coupled with the first feed roll and configured to adjust the lateral skew angle of the first axis of rotation relative to said guide surface.

16. A workpiece conveyance system comprising:
a first transfer with a first workpiece support surface and a first longitudinal axis, the first transfer configured to transport workpieces in a first direction of flow in an initial orientation relative to the first direction of flow; and
a feed roll assembly operatively coupled with the first transfer and configured to transport the workpieces to or from said first transfer substantially in said initial orientation in a second direction of flow that is transverse to the first direction of flow, the feed roll assembly comprising
a support having a first side and a generally opposite second side, the first side having a guide surface that extends along said first side, and
a first feed roll rotatably coupled to the support and spaced apart from an opposing second feed roll by a gap, the first and second feed rolls positioned to engage generally opposite first and second longitudinal sides, respectively, of the workpieces, the first feed roll being rotatable in a first rotary direction and having a first end, a second end, and a first axis of rotation that extends outwardly from the first side of the support, the second end having a diameter greater than the diameter of the first end, and the first axis of rotation extending perpendicular to the second direction of flow and laterally skewed relative to the guide surface,
wherein the first feed roll and the second feed roll are collectively operable to drive successive ones of the workpieces through said gap in the second direction of flow in substantially the initial orientation, and
wherein the guide surface is positioned to engage a third longitudinal side of successive ones of the workpieces entering or exiting the gap between the second end of the first feed roll and the second feed roll.

17. The workpiece conveyance system of claim 16, wherein the second feed roll is rotatably coupled to the support and positioned generally above or below the first feed roll.

18. The workpiece conveyance system of claim 16, the first feed roll being tapered generally constantly from the second end to the first end.

19. The workpiece conveyance system of claim 18, the diameter of the first end of the first feed roll being at least twice the diameter of the second end of the first feed roll.

20. The workpiece conveyance system of claim 17, the first feed roll having a first workpiece engaging surface and the second feed roll having a second workpiece engaging surface, the first and second workpiece engaging surfaces defining said gap, and said gap being generally horizontally parallel to the first workpiece support surface.

21. The workpiece conveyance system of claim 20, wherein the first feed roll is disposed above the second feed roll and the gap has a generally constant vertical height from the distal end to the proximal end of the first feed roll.

22. The workpiece conveyance system of claim 20, wherein the first feed roll is disposed above the second feed roll and the gap has a greater vertical height at the distal end of the first feed roll than at the proximal end of the first feed roll.

23. The workpiece conveyance system of claim 16, further comprising a second transfer having a second workpiece support surface, the second transfer being operatively coupled to the feed roll assembly and configured to transport the workpiece in a third direction of flow with the workpiece remaining substantially in the initial orientation relative to the first direction of flow, the third direction of flow being transverse to the first and second directions of flow, and the first transfer, the feed roll assembly, and the second transfer defining a continuous path of flow from the first transfer to the second transfer.

24. The workpiece conveyance system of claim 23, further comprising a processing apparatus operatively coupled to the second transfer, the processing apparatus having at least one movable element selected from the group consisting of a guide element, a cutting element, and a chipping head.

25. The workpiece conveyance system of claim 17, further comprising a first feed roll drive coupled to the first feed roll and a second feed roll drive coupled to the second feed roll, the first and second feed roll drives configured to drive the first and second feed rolls in generally opposite rotary directions, respectively.

26. The workpiece conveyance system of claim 16, the first workpiece support surface comprising a plurality of lugs disposed at regular intervals along the first workpiece support surface.

27. The workpiece conveyance system of claim 16, wherein the feed roll assembly and the first transfer are positioned along a path of workpiece flow, the workpiece conveyance system further comprising a scanner configured to scan the workpiece and generate scan data representing one or more characteristics of the workpiece.

28. The workpiece conveyance system of claim 27, the scanner comprising an imaging device positioned along the path of workpiece flow and a computing device operatively coupled to the imaging device, the scanner having executable instructions operable, upon execution, to determine a corrective adjustment to a position of the first feed roll or a rotational speed of the first feed roll and to generate a command to cause the corrective adjustment.

29. The workpiece conveyance system of claim 28, the executable instructions further operable, upon execution, to determine an actual or predicted gap length between two successive workpieces and to determine the corrective adjustment based at least in part on said gap length.

30. The workpiece conveyance system of claim 28, further comprising a processing apparatus operatively coupled to the scanner, the processing apparatus having a movable element configured to cut or reposition the workpiece, wherein the executable instructions are further operable, upon execution, to send a command to the processing apparatus to reposition the movable element based at least on an optimized processing solution for the workpiece.

* * * * *